3,340,503
VEHICLE EMERGENCY WARNING SYSTEM
Janet J. Johnston and Henry H. Johnston, both of Rte. 1, Box 201, Winters, Calif. 95694
Filed Sept. 21, 1966, Ser. No. 580,949
2 Claims. (Cl. 340—81)

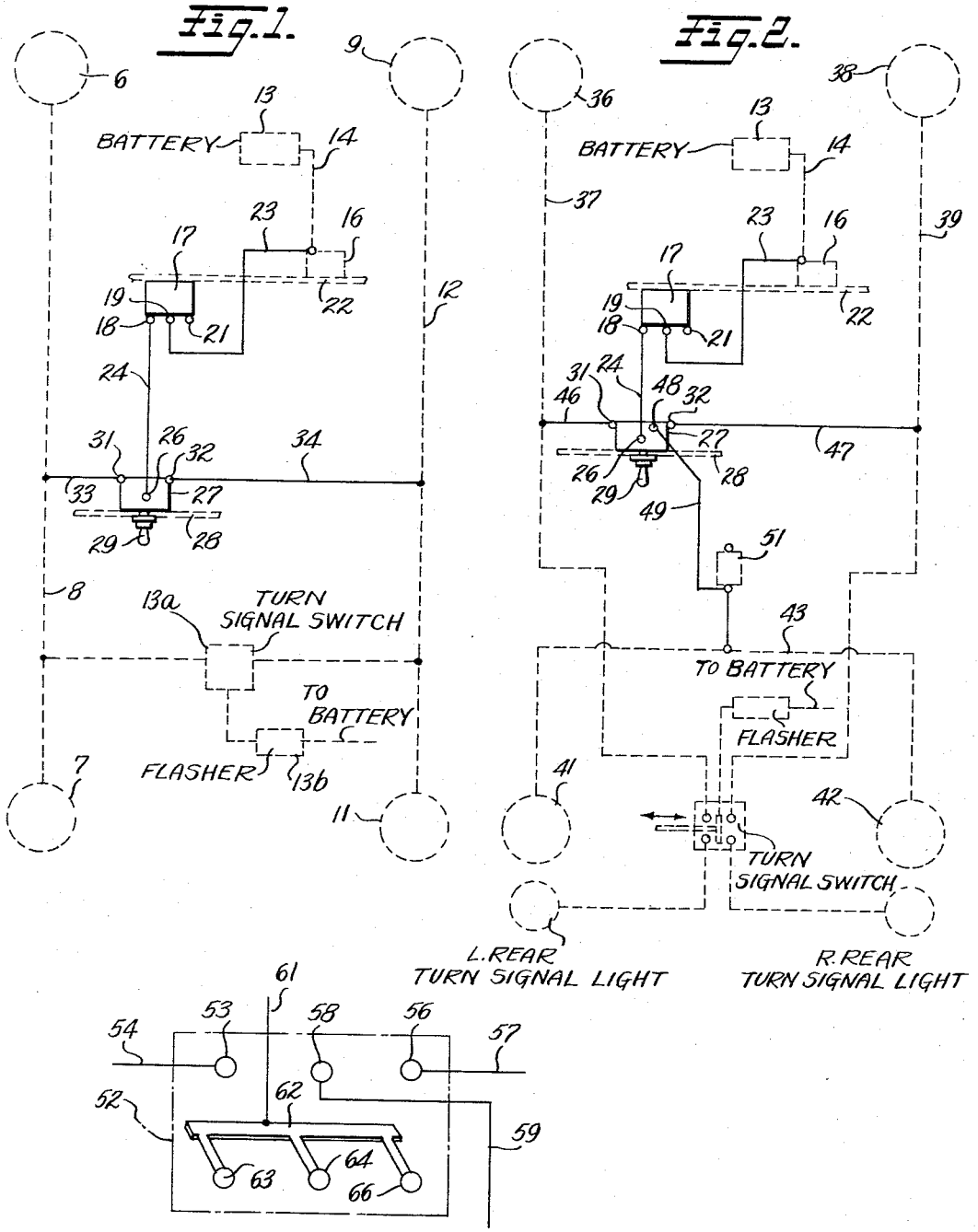

ABSTRACT OF THE DISCLOSURE

The disclosure comprises means for application to the customary motor vehicle such as a passenger car or a truck for utilizing portions of the signalling system already installed on the vehicle or as a new system in new vehicles in order to produce a different form of signalling operation especially to indicate an emergency condition at the vehicle.

---

This application is a continuation-in-part of our copending application Ser. No. 286,560, filed July 31, 1964, now abandoned.

The invention relates to improvements in vehicle emergency warning systems.

It is an object of the invention to provide simple and direct means for application to existing vehicles which will provide an additional function for the warning system already installed to indicate an emergency situation.

Another object of the invention is to provide a vehicle emergency warning system that can instantly be put into operation.

Another object of the invention is to provide a vehicle emergency warning system that is simple and inexpensive to provide and that can easily and quickly be installed on an existing vehicle or in a new vehicle.

Another object of the invention is to utilize much of the mechanism already standard or available in motor vehicles for adapting such mechanism to additional uses.

Another object of the invention is to provide on a vehicle means for indicating in all directions that the vehicle is in an emergency condition.

Other objects together with the foregoing are attained in the embodiments of the invention described in the accompanying description and illustration in the accompanying drawings, in which:

FIGURE 1 is a diagrammatic showing of the emergency warning system of the invention;

FIGURE 2 is a similar diagram showing a modified version of our vehicle emergency warning system; and FIGURE 3 is a diagram showing an alternative form of manual switch for use in the vehicle emergency warning system.

A customary vehicle is normally provided on one side with a front turn indicator light 6. On the same side of the vehicle and at the rear is another turn indicator light 7, the lights 6 and 7 usually being connected as a first pair by a first conductor 8. In a somewhat similar fashion, on the other side of the vehicle at the forward portion there is provided a turn indicator light 9, and at the rear of the vehicle another turn indicator light 11 is provided which is connected with the light 9 to form a second pair by means of a second conductor 12. The vehicle is customarily provided also with a source of electricity such as a storage battery 13 which is connected by a lead 14 to a junction box 16 which may be in the form of a relay or other terminal board. Existing equipment includes means for operating said turn signals for directional purposes comprising a turn signal switch 13a and a flasher 13b which is connected by means (not shown) to battery 13.

Pursuant to the invention, there is preferably provided in addition to the other mechanism already on the vehicle, a circuit interrupter 17. This conveniently is a standard type unit effective to interrupt a circuit periodically and normally is provided with three terminals 18, 19 and 21. The interrupter 17 is conveniently mounted on any portion of the vehicle but can be readily installed on a fire wall 22. Electricity is supplied from the source 13 to the interrupter 17 by means of a third conductor 23 joined to the terminal mechanism 16 and extending, for example, to the terminal 19 on the interrupter 17. Also pursuant to the invention, the interrupter is connected by a fourth conductor 24 extending from the terminal 18 to a corresponding terminal 26 on a manual switch 27 conveniently mounted on the instrument panel 28 of the vehicle. The switch 27 is likewise a standard unit and has a toggle operator 29 in the usual instance and has in addition to the terminal 26 other terminals 31 and 32. In accordance with the invention, a fifth conductor 33 is extended from the terminal 31 to a convenient junction point in the first conductor 8, while a sixth conductor 34 is joined to the terminal 32 and extends to a convenient junction point in the second conductor 12. The usual grounded returns are assumed and are not illustrated.

The circuitry thus established is such as to provide electricity in the conductor 23 and at the center connection 19 of the interrupter 17. The interrupter when the circuit is completed serves alternately to make and break a connection between the terminals 18 and 19, the commercially provided terminal 21 being shown as unused in this instance, although it may be connected by a suitable lead to a grounded pilot or indicator light on the instrument panel. The circuit is completed by manual operation of the toggle switch 29, which simultaneously interconnects the terminal 26 and the terminals 31 and 32. The effect of this is simultaneously to energize all of the turn signal lights 6, 7, 9 and 11 and because of the operation of the interrupter 17 these turn indicator lights all flash repeatedly and simultaneously. In this way, anyone observing the vehicle from any quarter can detect the simultaneous blinking of all of the turn indicator lights and learn therefrom that the vehicle is in emergency condition.

When the emergency has been terminated and it is no longer necessary to afford a signal, a manual operation of the toggle switch 29 disconnects the turn indicator signals from the battery and leaves them available for customary, non-emergency operation.

As an alternative form and for use in certain vehicles, there is provided an arrangement as shown in FIGURE 2. In this instance, the first turn indicator light 36 is provided with the customary lead 37, while a similar front turn indicator light 38 is provided with a comparable lead 39. At the other end of the vehicle, turn indicator lights may be provided, but instead it is preferred to use the normally provided left-hand stop light indicator 41 and right-hand stop light indicator 42. These form a pair connected by a primary conductor 43. The vehicle has a storage battery 13, as before, connected by a wire 14 to a terminal block 16 which might be a relay installed on the fire wall 22.

Also mounted on the fire wall is a circuit interrupter 17, as before, having terminals 18, 19 and 21, respectively. The terminal 19 is joined by a third conductor 23 to the terminal mechanism 16. From the terminal 18 a fourth conductor 24 extends to a terminal 26 on a manual switch 27 installed, as before, on the instrument panel 28. A manually actuated toggle lever 29 controls the switch 27. Provided on the switch, as before, are terminals 31 and 32. The terminal 31 is connected by a first lead 46 to the conductor 37, while the terminal 32 is connected by a second lead 47 to the conductor 39.

In this instance, the manual switch 29 also has a terminal 48 which is joined by a third lead 49 to the primary conductor 43, a convenient point of attachment being at the normally provided stop light switch 51.

In the operation of this structure, when an emergency signal is to be given, the manual switch 29 is actuated. This puts in circuit with the storage battery 13 not only the interrupter 17, but likewise the two forward turn indicator lights or indicators 36 and 38. By also connecting in the primary conductor 43, this simultaneously puts in circuit the stop light indicators 41 and 42. The signal given is thus the simultaneous blinking of all four of the lights 36, 38, 41 and 42, very much as before except that the rear turn indicator lights are not utilized, but the stop lights 41 and 42 are utilized in their stead.

In some instances it is desired to preclude any possibility of interaction between the applied vehicle emergency warning system pursuant to this invention and any circuitry that may already be available on the vehicle. In this instance, the mechanism shown in FIGURE 3 is employed. This is a manually actuated switch mechanism 52 having a terminal 53 for a conductor 54 comparable to either the conductor 33 or the conductor 46. There is also provided a terminal 56 for a conductor 57 comparable to the conductor 34 or the conductor 47. Also, there is provided a terminal 58 for a conductor 59 which corresponds to the conductor 49. The switch mechanism 52 is joined to the source of electricity through a conductor 61 leading to an interrupter in a fashion comparable to that of the conductor 24. The manual actuator 62 of the switch mechanism in its position shown in FIGURE 3 is comparable in its manual operation to the switch 29 in FIGURES 1 and 2 but does not establish any continuous circuitry, but when moved to another position, terminals 63, 64 and 66 are all interconnected and engage the terminals 53, 58 and 56 to establish electrical continuity without interference with any other circuitry on the vehicle.

We claim:
1. A vehicle emergency warning system adapted to be installed on vehicles having a storage battery, having a first pair of turn indicator lights on one side of the vehicle permanently connected by a first conductor, having a second pair of turn indicator lights on the other side of the vehicle permanently connected by a second conductor, and means for operating said turn signals for directional purposes, said emergency warning system comprising in addition to the existing equipment on the vehicle:
   (a) a circuit interrupter effective to interrupt a circuit periodically;
   (b) a conductor for connecting said circuit interrupter to said storage battery;
   (c) a manual switch;
   (d) a conductor for connecting said circuit interrupter to said manual switch;
   (e) conductor means for connecting said manual switch to said first and second conductors, said manual switch being operable to connect said interrupter to said conductor means, whereby when said warning system has been installed on the vehicle the circuit interrupter is effective simultaneously and repeatedly to flash said first pair and said second pair of turn indicator lights for as long as said manual switch is in on position.

2. A vehicle emergency warning system for vehicles having a storage battery, having a first pair of turn indicator lights on one side of the vehicle permanently connected by a first conductor, having a second pair of turn indicator lights on the other side of the vehicle permanently connected by a second conductor, and means for flashing said turn signals for directional purposes, said emergency warning system comprising in addition to and in combination with the aforementioned equipment on the vehicle:
   (a) a circuit interrupter effective to interrupt a circuit periodically;
   (b) a third conductor connecting said circuit interrupter to said storage battery;
   (c) a manual switch having separate first, second and third terminals, the first terminal being connected simultaneously to the second and third terminals upon actuation of the switch to on position;
   (d) a fourth conductor connecting said circuit interrupter to the first terminal of said manual switch;
   (e) a fifth conductor connecting the second terminal of said manual switch to said first conductor;
   (f) a sixth conductor connecting the third terminal of said manual switch to said second conductor, whereby the circuit interrupter is effective simultaneously and repeatedly to flash said first pair and said second pair of turn indicator lights for as long as said manual switch is in on position.

References Cited

UNITED STATES PATENTS

| | | | |
|---|---|---|---|
| 2,790,156 | 4/1957 | Hollins | 340—81 |
| 2,843,835 | 7/1958 | Hollins | 340—81 |
| 3,002,127 | 9/1961 | Grontkowski | 340—81 |
| 3,185,961 | 5/1965 | Du Rocher | 340—81 |
| 3,235,837 | 2/1966 | Brown | 340—81 |

NEIL C. READ, *Primary Examiner.*

I. LEVIN, D. L. TRAFTON, *Assistant Examiners.*